United States Patent [19]

Matsumura et al.

[11] Patent Number: 4,566,250
[45] Date of Patent: Jan. 28, 1986

[54] METHOD AND APPARATUS FOR PRODUCING BAG-SHAPED PACKAGES WITH CAP BODY AND CONTENT

[75] Inventors: Wakuo Matsumura, Hirakata; Noboru Kitazawa, Kyoto; Yoshiaki Ohigashi, Uji, all of Japan

[73] Assignee: Unitika Ltd., Japan

[21] Appl. No.: 542,683

[22] Filed: Oct. 17, 1983

[30] Foreign Application Priority Data

| Oct. 18, 1982 [JP] | Japan | 57-181264 |
| Nov. 18, 1982 [JP] | Japan | 57-201171 |
| Jan. 31, 1983 [JP] | Japan | 58-12792 |
| Feb. 14, 1983 [JP] | Japan | 58-21603 |
| Sep. 9, 1983 [JP] | Japan | 58-165144 |

[51] Int. Cl.<sup>4</sup> ............................................. B65B 61/00
[52] U.S. Cl. ................................. 53/128; 53/551
[58] Field of Search ............... 53/451, 410, 416, 128, 53/51, 551, 133, 412; 83/375, 380; 141/10, 114, 390; 414/752, 744 B, 737

[56] References Cited

U.S. PATENT DOCUMENTS

| 1,860,954 | 5/1932 | Risser | 53/317 |
| 2,950,588 | 8/1960 | Gausman | 53/51 |
| 3,069,303 | 12/1962 | Scholle | 493/213 |
| 3,244,576 | 4/1966 | Swartz . | |
| 3,334,466 | 8/1967 | Scholle | 53/451 |
| 3,513,989 | 5/1970 | English | 414/737 |
| 3,596,428 | 8/1971 | Young | 53/451 |
| 3,611,657 | 10/1971 | Inoue et al. | 53/551 |
| 3,815,317 | 6/1974 | Toss | 53/451 |
| 3,868,891 | 3/1975 | Parish | 493/213 |
| 3,894,381 | 7/1975 | Christine . | |
| 3,921,928 | 11/1975 | Henry | 53/51 |
| 3,992,966 | 11/1976 | D'Agostino | 83/375 |
| 4,004,399 | 1/1977 | Borrello . | |
| 4,009,551 | 3/1977 | Greenawalt . | |
| 4,043,098 | 8/1977 | Putnam, Jr. . | |
| 4,055,032 | 10/1977 | Hammond | 53/451 |
| 4,128,985 | 12/1978 | Simmons | 53/551 |
| 4,144,693 | 3/1979 | Ogata | 53/51 |
| 4,317,321 | 3/1982 | Torterotot et al. | 53/451 |
| 4,341,522 | 7/1982 | Gaubert | 493/213 |

Primary Examiner—John Sipos
Assistant Examiner—Donald R. Studebaker
Attorney, Agent, or Firm—Larson and Taylor

[57] ABSTRACT

New method and apparatus for automatically producing a number of bag-shaped packages with a cap body integrally attached thereto and specific content filled at a high operational efficiency are disclosed. They are produced one by one using continuous thin flat film of synthetic resin as raw material by way of the steps of punching a cap body insert hole, inserting the cap body portion of the cap body into the punched hole, heat sealing it to the film, forming a tubular product, effecting longitudinal heat sealing, effecting transverse heat sealing of the lower end part of the tubular product to form a bag-shaped product, filling the latter with specific content, effecting transverse heat sealing of the upper end part of the content filled bag-shaped product and cutting off the latter along the center line extending between the adjacent products. Longitudinal heat sealing is generally effected while the film is displaced downward. Alternatively, longitudinal heat sealing may be effected while it is held immovably. Operation in each of the working sections is controlled by signals transmitted from a sensor adapted to detect the existence of one of marks printed on the film. Most of operations in the working sections are carried out while the film is held immovably.

8 Claims, 14 Drawing Figures

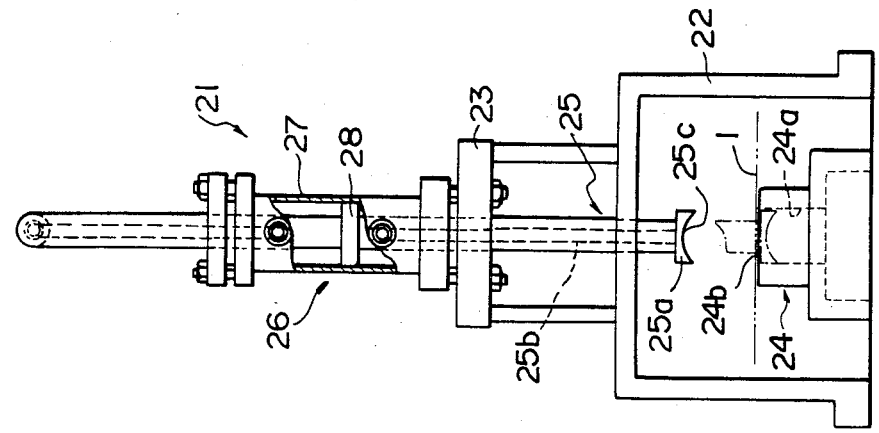
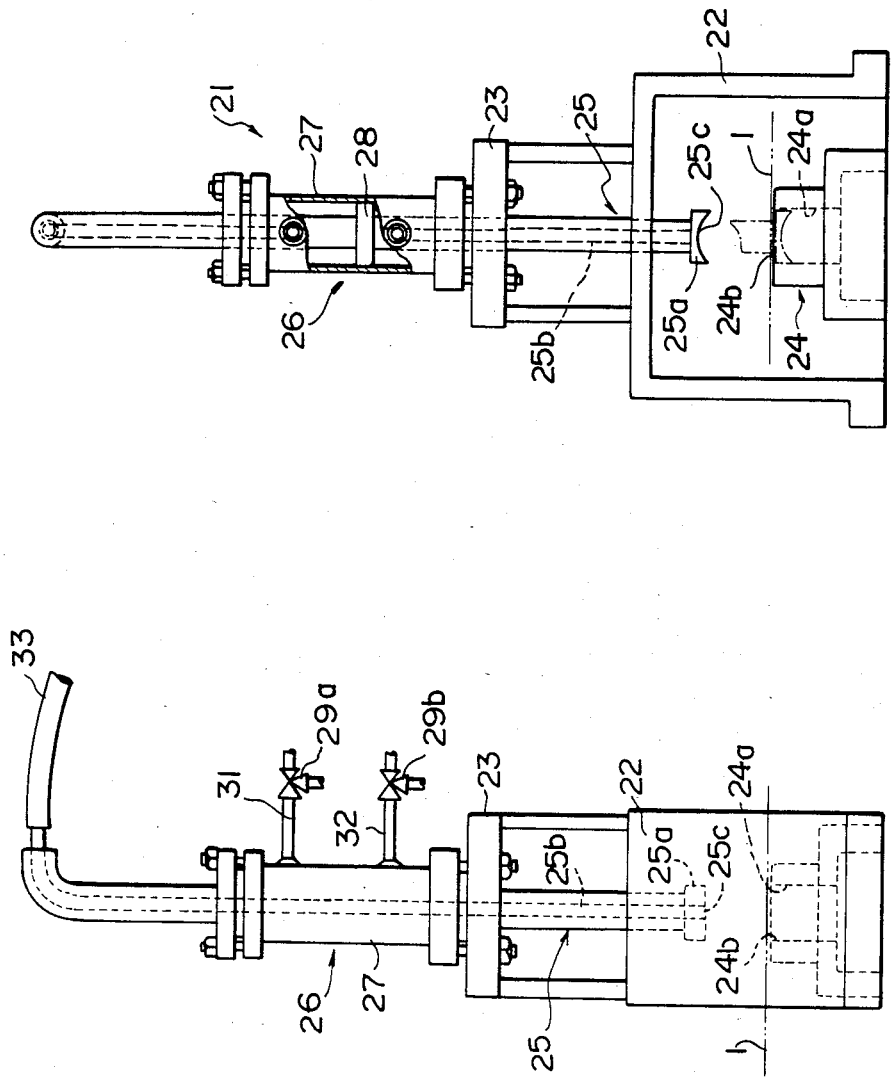

FIG. 10
FIG. 11
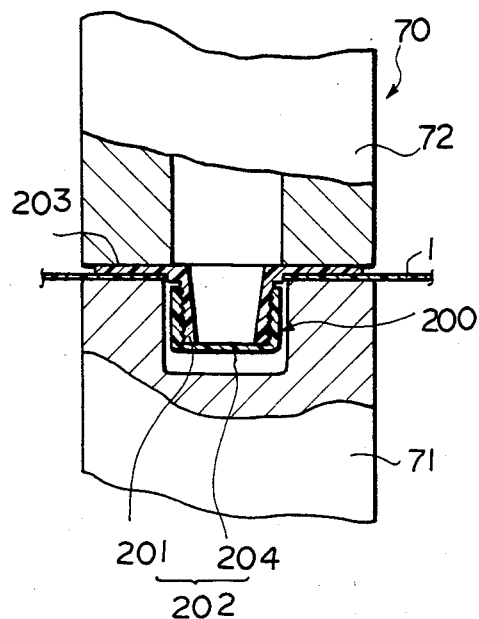
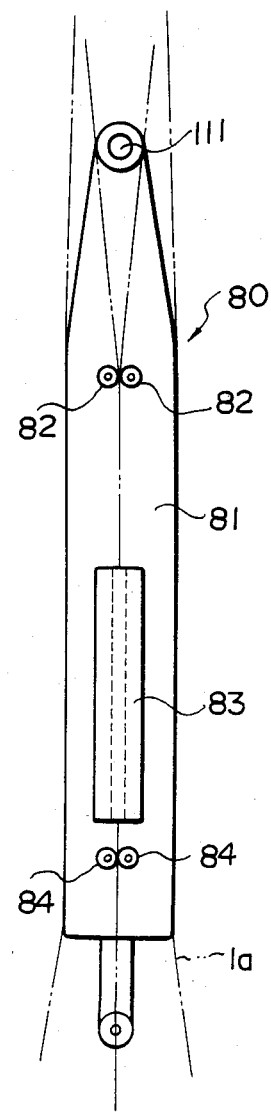

FIG. 13
(X)
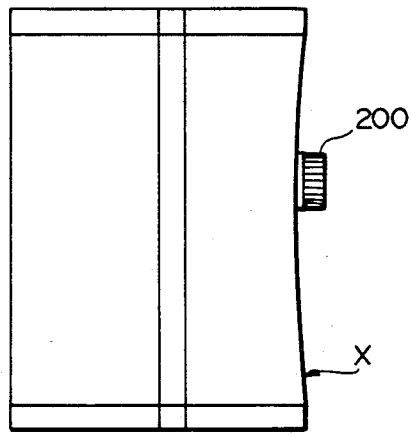
(Y)
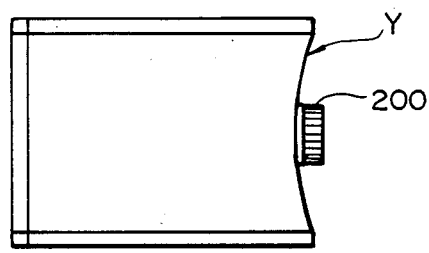

METHOD AND APPARATUS FOR PRODUCING BAG-SHAPED PACKAGES WITH CAP BODY AND CONTENT

BACKGROUND OF THE INVENTION

1. Field of the Invention

The present invention relates to method and apparatus for producing a number of bag-shaped packages with a cap body attached thereto respectively using continuous thin flat film of synthetic resin as raw material and more particularly to improvement of or relating to method and apparatus for automatically producing a number of bag-shaped packages with a cap body integrally attached thereto and specific content filled therein respectively using a roll of film of synthetic resin, wherein production is carried out by way of the steps of forming a bag-shaped product with a cap body integrally attached thereto using a part of film intermittently unreeled from the film supplying section by operating each of the essential working sections while film is held immovably after completion of intermittent transportation, filling the thus formed bag-shaped product with liquid or viscous fluid in the content filling section, transversely sealing the upper opened end part of the content filled bag-shaped package and effecting transverse cutting along the center line of the transversely sealed area between the adjacent content filled bag-shaped packages.

2. Description of the Prior Art

Conventional packages of synthetic resin as often found in consumer markets are well known, for instance, from U.S. Pat. Nos. 4,004,399, 4,009,551 and 4,043,098. Each of the conventional packages is produced using synthetic resin film by way of the steps of forming a bag-shaped package, filling it with pulverized material, liquid or viscous fluid and finally heat sealing its opened end part but no cap body is attached to them. Thus, the conventional packages have a problem that once a consumer opens it by cutting off a part thereof, residual content held therein after usage is difficult to be dealt with and in many cases it is thrown away as waste material To eliminate the above-mentioned problem with respect to the conventional bag-shaped packages a number of development works were conducted for producing bag-shaped packages having a cap body integrally attached thereto so as to allow a required volume of content to be taken out therefrom and a part of the thus developed bag-shaped packages has beed already delivered to consumer markets typical bag-shaped packages of the above-mentioned type are produced by way of the steps of forming a packing bag with a screw cap body heat sealed at one corner thereof or at a predetermined position located on the upper opened end part thereof using the same multi-layered structure of composite film maqe of synthetic resin as raw material employed for producing bag-shaped packages of the invention mostly by manual operations in the household industry, filling it with content with a screw cap removed therefrom at another station different from the station where bag forming operation is carried out and finally closing the filling port with the screw cap again.

As will be readily apparent from the above description, the conventional bag-shaped packages having a cap body attached thereto respectively are produced in accordance with an ineffective production system which will fail to meet social requirements for remarkably increased demand in the future not only in respect of bag forming operation but also in respect of filling operation and therefore their production is carried out at an expensive cost. Accordingly, the conventional method for producing a number of bag-shaped packages with a cap body integrally attached thereto respectively as described above has a serious economical problem

BRIEF SUMMARY OF THE INVENTION

The present invention is concerned with method and apparatus for continuously producing a number of bag-shaped packages with a cap body integrally attached thereto and specific content filled therein respectively using a roll of film of synthetic resin, wherein production is carried out by way of the steps of forming a bag-shaped product with a cap body integrally attached thereto using a fore part of film intermittently unreeled from the film supplying section by a predetermined length equal to that of one package by simultaneously operating each of the essential working sections in conformance with the predetermined order of movements while the film is transported or is held immovably after completion of intermittent transportation, filling the thus formed bag-shaped product with liquid or viscous fluid in the content filling section, transversely heat sealing the upper opened end part of the content filled bag-shaped package and finally effecting transverse cutting along the center line of the transversely sealed area between the adjacent content filled bag-shaped packages.

Hence, it is a major object of the invention to provide method and apparatus for continuously producing at an inexpensive cost a number of bag-shaped packages with a cap body integrally attached thereto and specific content filled therein respectively at an excellently high operational efficiency using continuous thin flat film made of synthetic resin as raw material, each of said bag-shaped packages being such that a required volume of content can be taken out therefrom by depressing it with an operator's finger pressure It is another object of the invention to provide method and apparatus for continuously producing at an inexpensive cost a number of bag-shaped packages with a cap body integrally attached thereto and specific content filled therein respectively at an excellently high operational efficiency using continuous thin flat film made of synethic resin as raw material, each of said bag-shaped packages being such that said cap bocy is located at a substantially constant position on the film.

It is other object of the invention to provide method and apparatus for continuously producing at an inexpensive cost a number of bag-shaped packages with a cap body integrally attached thereto and specific content filled therein respectively at an excellently high operational efficiency using continuous thin flat film made of synthetic resin as raw material, each of said bag-shaped packages being such that any waste material such as fragmental piece of punched film or the like is not contained therein.

It is a further object of the invention to provide method and apparatus for continuously producing at an inexpensive cost a number of bag-shaped packages with a cap body integrally attached thereto and specific content filled therein respectively at an excellently high operational efficiency using continuous thin flat film made of synthetic resin as raw material, each of said bag-shaped packages being such that a substantially constant volume of content is filled therein.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below. It should be noted that they schematically illustrate an apparatus for continuously producing a number of bag-shaped packages with a cap body integrally attached thereto and specific content filled therein respectively at an excellently high operational efficiency using continuous thin flat film made of synthetic resin as raw material, wherein such insignificant components constituting the apparatus as readily understood by any expert in the art are eliminated from their illustration for the purpose of simplification.

FIG. 2 is a side view of a punching unit in a punching section by means of which a hole for receiving a cap body therein is punched out on continuous flat thin film made of synthetic resin while the latter is held immovably, as seen in the direction at a right angle relative to that of intermittent transportation of the film.

FIG. 3 is a front view of the punching unit in FIG. 2.

FIG. 10 is a partially sectioned side view of a cap body sealing section illustrating in enlarged scale how a cap body is integrally fitted to the film by heat sealing the flange portion of the cap body to the latter.

FIG. 11 is a front view of a longitudinal sealing section schematically illustrating how both the side edges of the film are heat sealed to one another in a juxtaposed relation.

FIG. 13(X) is a plan view of a final product of bag-shaped package with a cap body integrally attached thereto and specific content filled therein which is produced in the apparatus of the invention, and FIG. 13(Y) is a plan view of another type of final product of bag-shaped package with a cap body integrally attached thereto and specific content filled therein which is produced in the apparatus of the invention.

It should be noted that same or similar components shown throughout the drawings are identified with the same reference numerals.

DESCRIPTION OF THE PREFERRED EMBODIMENTS

Figure 1:
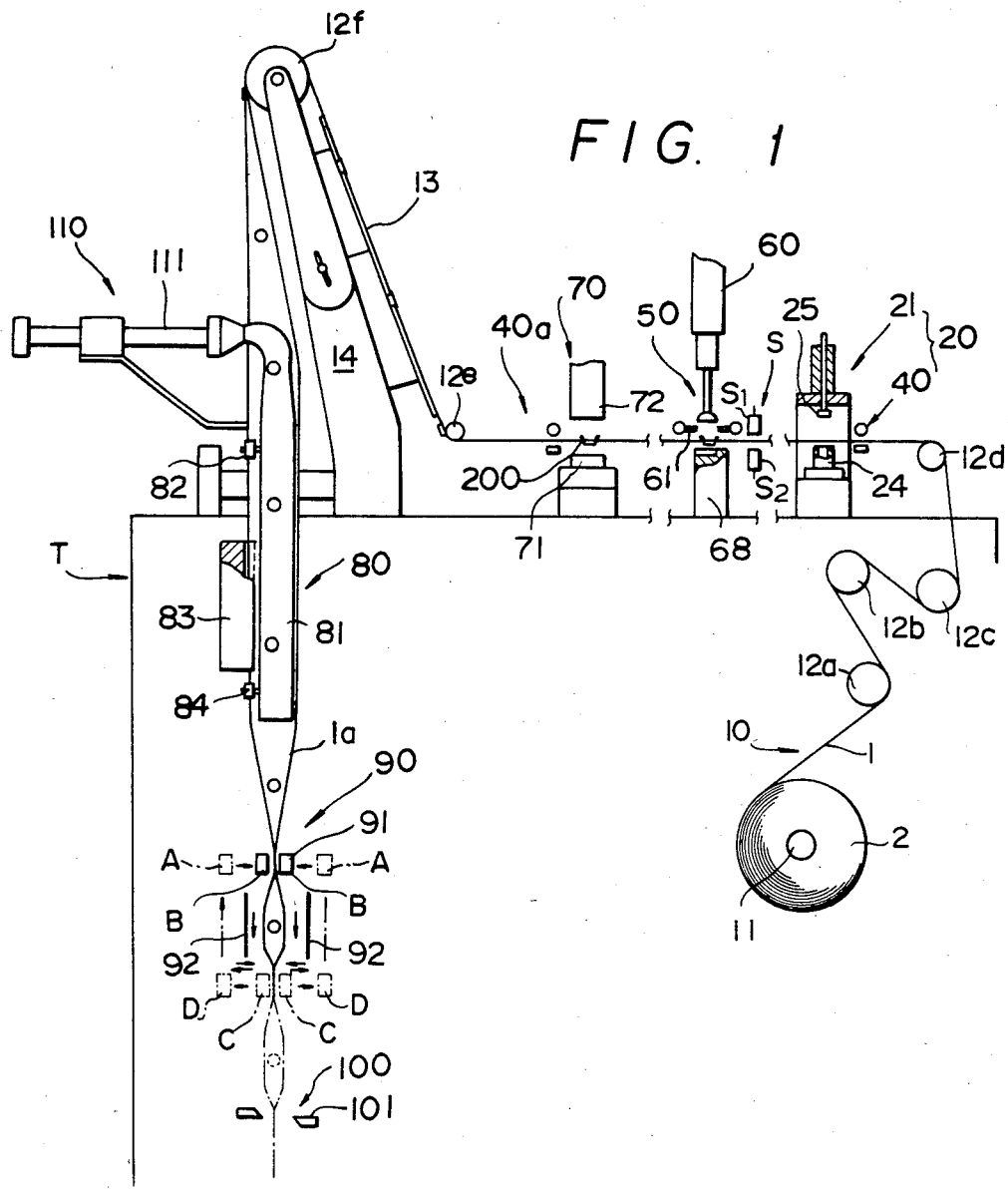
FIG. 1 a schematic side view of an apparatus for producing a number of bag-shaped packages with a cap body integrally attached thereto and specific content filled therein respectively in accordance with the first embodiment of the invention, particularly illustrating how components constituting the apparatus are arranged throughout the latter.

Now, the present invention will be described in a greater detail hereunder with reference to the accompanying drawings which schematically illustrate an apparatus for carrying out a method according to the first and second embodiments of the invention in which a number of bag-shaped packages with a cap body (cap type closure means) integrally attached thereto respectively are continuously produced at a high operational efficiency using thin flat film made of synthetic resin in the form of strip as raw material, each of said packages being filled with specific content.

Prior to entering description of the first and second embodiments of the invention with reference to the accompanying drawings, thin flat film of synthetic resin for producing a number of bag-shaped packages with a cap body integrally attached thereto respectively (hereinafter referred to simply as film), will be first described below.

Film employable for the invention is required to have physical properties such as resistibility against formation of pin holes, function as gas barrier and others each of which is essential requirement for film material for packages and which vary depending on its application.

This film may be a single layer of film made of polyolefin or the like material and it is most preferable that it is a composite film comprising more than two layers including a sealant, the composite film having many superier properties combined with those of more than two layers.

The structure of the composite film varies depending on the manner of joining both the side edge portions thereof to one another, that is, it varies depending on whether a so-called juxtaposition type sealing process is employed or a so-called envelope type sealing process is employed. Specifically, the former process is such that sealing is effected with the inside faces of both the longitudinally extending side edge portions of the film coming in surface contact with one another, whereas the latter process is such that sealing is effected with both the longitudinally extending edge portions of the film overlapped one above another while the inside face of the one edge portion coming in surface contact with the outside face of the other edge portion.

In case of the juxtaposition type sealing process employed for joining together both the vertically extending side edge portions a composite film is preferably used which includes at last an outer layer of polyolefin film which has excellently high safety from the viewpoint of hygiene with respect to foodstuff constituting the content of packages and good heat sealability and an opposite outer or inner layer of film which has physical properties such as resistibility against formation of pin holes, function as gas barrier and others each of which is essential requirement for constituting a bag-shaped container, said layer serving as a base film.

On the other hand, in case of the envelope type sealing process employed for joining together both the longitudinally extending side edge portions a composite film comprising at least three layers is generally used, wherein the outer layer is constituted of polyolefin film which has excellently high safety from the viewpoint of hygiene and good sealabilty, the inner layer serves at least as a base film and the opposite outer layer is constituted of film having good sealability.

It should be noted that film employed for practicing the present invention has a number of marks printed in an equally spaced relation in the longitudinal direction and their location, that is, a distance between the adjacent marks is determined in dependence on a capacity of bag-shaped packages with a cap body integrally attached thereto respectively (hereinafter referred to simply as package) which will be produced in accordance with a method of the invention. The following description will be made with unreeled film identified by reference numeral 1 and a roll of film identified by reference numeral 2.

Next, an apparatus for continuously producing a number of packages in accordance with the first embodiment of the invention will be described with reference to FIGS. 1 to 11. Specifically, description will be first made with reference to FIG. 1 as to how components constituting the apparatus of the invention are arranged and description will then be made as to how each of the components is constructed.

In FIG. 1, reference letter T designates a framework for the apparatus. The components constituting the apparatus are arranged at a predetermined distance kept therebetween on the framework T, and moreover a plurality of rollers $12_a$ to $12_f$ including a dancer roller $12_b$ as well as a guide member 13 are disposed at a predetermined position thereon so as to serve as auxiliary members for intermittently transporting the film 1.

Reference numeral 10 designates a film supplying section including a support shaft 11 on which a roll of film 2 is rotatably supported. Reference letter S denotes a sensor by means of which a number of marks printed on the film 1 are detected one by one and a detected signal is transmitted to each of the essential components so as to actuate the latter in such a manner as described later. Reference numeral 20 denotes a punching section. Reference numeral 50 does a cap body fitting section. Reference numeral 70 denotes a cap body sealing section. Reference numeral 80 denotes a longitudinal sealing section, reference numeral 90 denotes a transverse sealing section which serves also for pulling the film downwardly. Reference numeral 110 does a filling section and reference numeral 100 denotes a cutting section.

Since operation of each of the punching section 20, the cap body fitting section 50, the cap body sealing section 70, the longitudinal sealing section 80, the cutting section 100 and the filling section 110 is adapted to start in response to mark detection signals transmitted from the sensor S while the film 1 is intermittently transported, it will be helpful that description will be made as to how the sensor S is operated and the transverse sealing section 90, which serves also for pulling the film downwardly, is operated so as to intermittently transport the film.

As described above, the sensor S is intended to optically detect the existence of marks printed on the film 1 in an equally spaced relation in the longitudinal direction, the distance between the adjacent marks being determined in dependence on a capacity of package (see packages X and Y in FIG. 13), and it comprises a light beam emitting portion $s_1$ and a light beam receiving portion $s_2$.

After completion of operations in the aforesaid working sections, each of which is caused to initiate operation in response to detection signals transmitted from the sensor S the film 1 is intermittently unreeled from the film supplying section 10 and thereby it is intermittently transported by means of a pair of transverse seal bars 91 in the transverse sealing section 90, said transverse seal bars 91 serving also for pulling the film, while transverse sealing is effected on a tubular product with a cap body attached thereto which is formed in the longitudinal sealing section 80 disposed above the transverse sealing section 90 or on a bag-shaped product with a cap body attached thereto in which specific content is filled, said tubular product and said bag-shaped product being clamped from both the sides with the aid of the transverse seal bars 91 during transverse sealing operation.

Specifically, the pair of transverse seal bars 91 are operated in the following manner. Namely, as is apparent from FIG. 1, they are immovably kept at the waiting positions A until each of the operations in the working sections is completed in accordance with detection signal transmitted from the sensor S; after completion of each of the operations they are displaced to the clamping positions B to firmly hold the tubular product or the bag-shaped product with specific content filled therein from both the sides and they initiate a pulling operation immediately after initiation of transverse sealing operation; until the sensor S detects the existence of next mark on the film 1 they are kept together to displace downwardly to the position C where the transverse sealing and downward pulling operation is completed; they are then displaced away from the positions C in accordance with said signal to reach the release positions D; and finally they are brought back to the initial waiting positions A.

Thus, the film 1 is intermittently transported.

Next, description will be made as to the punching section 20 with reference to FIGS. 2 to 5 which is disposed at the position located midway of the travelling passage of the film 1. The punching section 20 includes a punching station 21 which essentially comprises a stationary punching die 24 fixedly mounted beneath the travelling position of the film 1 in the frame 22 and a movable punch 25 located above the traveling position of the film 1 and adapted to be displaced up and down by means of a driving unit 26 fixedly mounted on a support stand 23, said movable punch 25 extending through the frame 22. In addition, the punching section 20 includes a film holding station 40.

As illustrated in FIGS. 2 and 3, the stationary punching die 24 in the punching station 21 has a through hole $24_a$ which is dimensioned so that a cap body portion 202 constituting a cap body 200 with a flange portion 203 attached thereto as illustrated in FIG. 10 is freely inserted through a punched hole on the film 1. Thus, the upper circular edge of the through hole $24_a$ builds a cutting edge $24_b$. On the other hand, the movable punch 25 includes a cutting edge $25_a$ at the lowermost end thereof adapted to come in slidable contact with the cutting edge $24_b$ and it is operated in the upward and downward directions by alternately introducing compressed air into the upper and lower chambers located above and below a piston 28 which is slidably inserted into a cylinder 27 constituting the driving unit 26, said introduction of compressed air being controlled by means of three way valves 29$_a$ and 29$_b$ on pipings 31 and 32. The rod-shaped movable punch 25 has a through hole 25$_b$ extending along the center axis which serves as an air passage and is in communication with a rubber hose 33 whereby compressed air delivered through the passage 25$_b$ is blown out of a discharge port 25$_c$ at the lowermost end of the latter. Thus, by blowing compressed air through the discharge port 25$_c$ continuously of at a time when punching is effected, it is possible to remove a fragment of film punched out of the film 1 without fail and thereby persistent sticking of the fragmental film to the film 1 caused under the electrostatic influence and an occurance of a malfunction, such as hindrance to next operation, entrance of the fragmental film into a final product or package, or the like attributable to the existence of any fragmental film, can be prevented. Thus, a hole through which a cap body is to be inserted can be punched out by displacing the movable punch 25 to the lowermost end position while the film 1 is held immovably. By repeating the punching operation as mentioned above, a number of cap body fitting holes are formed on the film 1 along the center line thereof or at any predetermined position located at an equal distance in the longitudinal direction.

Figure 4:
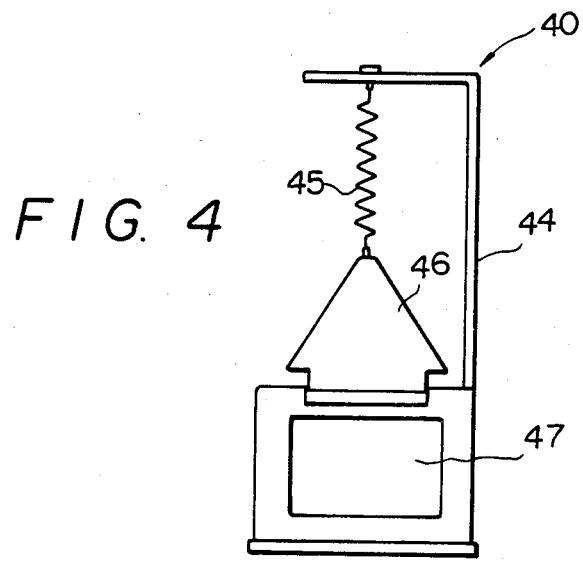
FIG. 4 is a side view of a film holding station disposed at the position located upstream of the punching section to firmly hold the film during punching operation.
Figure 5:
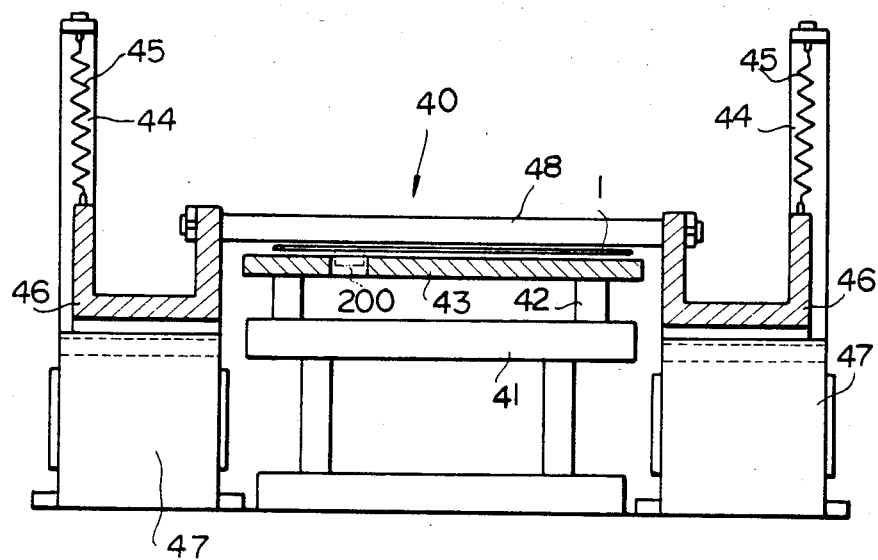
FIG. 5 is a front view of the film holding station in FIG. 4.

Next, description will be made as to the film holding station 40 particularly with reference to FIGS. 4 and 5. The film holding station 40 is adapted to operate immediately after a mark detection signal is transmitted from the sensor S whereby any failure of immediate stoppage of the film 1 due to elastic elongation of the latter can be prevented and therefore it comes to immediate stop at a predetermined position correctly. After completion of operation of the punching station 21 the film holding station 40 resumes its original position. As typically illustrated in FIGS. 4 and 5, the film holding station 40 essentially comprises: a table 43 made of elastic material which is firmly mounted above a base 41 at a predetermined height with the aid of a plurality of columns 42; a pair of U-shaped members 46 made of magnetizable material which are resiliently suspended from the top end of columns 44 by means of coil springs 45; a pair of electromagnets 47 adapted to magnetically attract said magnetizable members 46 in response to detection signals transmitted from the sensor S; and a roller 48 made of elastic material which is adapted to come in pressure contact with the table 43 with the film 1 being interposed therebetween as it is lowered under the influence of attractive force generated by the electromagnets 47, said roller 48 being fixedly connected to the magnetizable members 46 at its both ends.

After a cap body fitting hole is punched out on the film 1 at the punching section 20, the film 1 is transported by a predetermined distance so that said cap body fitting hole reaches the cap body fitting section 50 at which the cap body portion 202 is fitted into the cap body fitting hole with its flange portion 203 being held on the film 1.

As will be readily seen from FIG. 10, a cap body 200 comprises a cap body portion 202 and a flange portion 203, said cap body portion 202 including a cap 204 (such as a screw cap) of which outer diameter is dimensioned smaller than the inner diameter of the punched hole and a cap base 201 onto which said cap 204 is threadably fitted. To allow the flange portion 203 to be easily heat sealed to the layer of film constituting the inner wall of a package it is preferable that the flange portion 203 is made of the same material as that of said film. On the other hand, in view of the requirement for easy unscrewing of the cap 204 at a time when the latter is to be removed from a package it is preferable that the cap 204 is made of different material from that of cap base 201. For instance, the cap base 201 is made of polyethylene, whereas the cap 204 is made of polypropylene or the like material.

Next, description will be made as to the cap body fitting section 50 with reference to FIGS. 6 to 9. This cap body fitting section 50 essentially comprises a cap body alignment unit 51, a cap body feeding unit 55 and a cap body insert unit 60.

Figure 8:
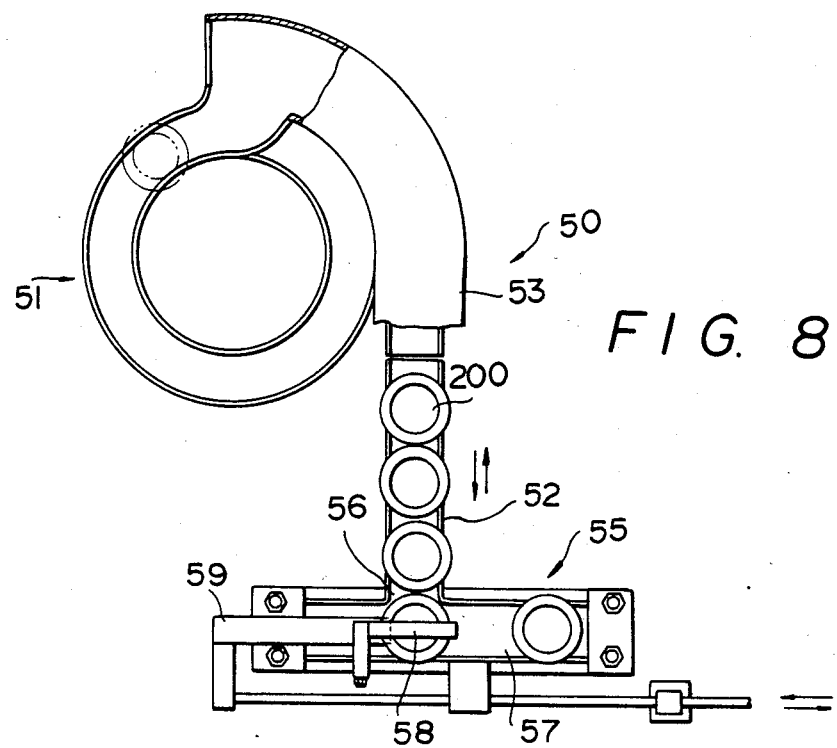
FIG. 8 is a plan view of a cap alignment member and a cap body feeding member in the cap body fitting section.
Figure 9:
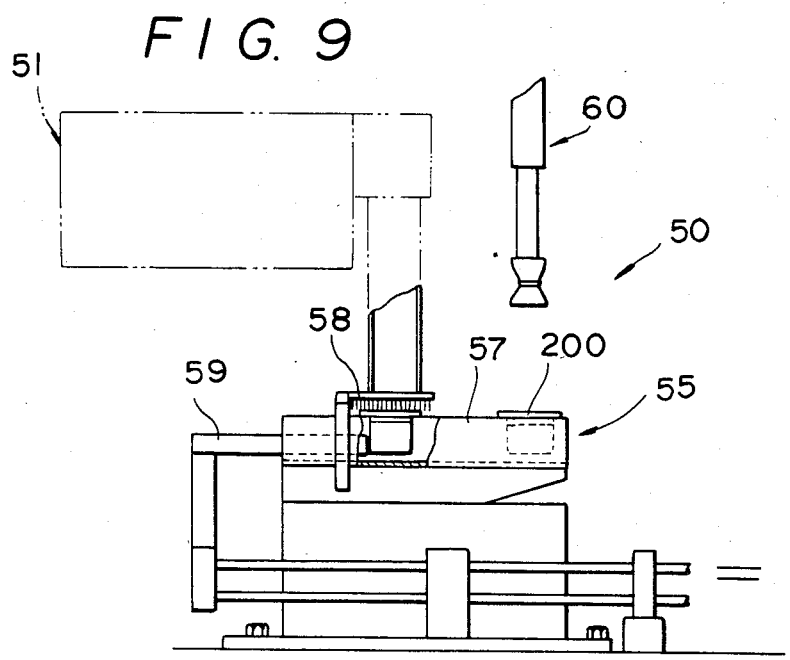
FIG. 9 view of the cap body feeding member in FIG. 8.

The cap body alignment unit 51 is typically constructed in the form of a so-called parts feeder adapted to arrange a number of parts in alignment with the aid of vibration. As the cap body alignment unit 51 starts its operation, cap bodies 200 are arranged in alignment while they climb up the inclined track gradually along the side walls whereby they are correctly postured during their movement in such a manner that their flange portion 203 is located upwardly and the their cap body portion 202 is oriented downward. After completion of selective arrangement of the cap bodies 200 in correct alignment they are held in a single line across a cap body alignment rail 52 which is located at the outlet of the cap body alignment unit 51. Since the cap body alignment rail 52 is supported at a slight downward inclination angle under the influence of vibration transmitted from the cap body alignment unit 51, the cap bodies 200 are caused to be arranged one after another without any clearance between the adjacent ones. In FIG. 8 a lower part of the cover 53 is shown as removed for the purpose of clear illustration but in practice the cover 53 extends across the whole length of the cap alignment rail 52 so that any of the cap bodies 200 is inhibited from moving away therefrom upwardly under the influence of vibration.

The cap body feeding unit 55 has an opening 56 on the one side wall through which just one cap body is received from the foremost end of an array of cap bodies on the cap body alignment rail 52 and moreover it has a displacement passage 57 so that the cap body is displaced in the direction at a substantially right angle relative to the direction of alignment on the cap body alignment rail 52. In the drawing reference numeral 58 designates a frictional stoppage member with a friction material such as brush or the like means fitted to the bottom thereof. The frictional stoppage member 58 serves to inhibit entrance of next cap body 200 into the displacement passage 57 with the early received cap body 200 being thrusted forward in the displacement passage 57 due to lateral vibration transmitted from the next cap body 200. Bristle, artifical lawn, rubber plate or the like material are preferably employable as material for the frictional stoppage member. As is apparent from the drawing, the frictional stoppage member 58 is disposed above the cap body 200 received in the displacement passage 57 while the lower end part of the frictional material is normally brought in close contact with the upper surface of the cap body 200 with a proper intensity of static frictional force applied thereto. Alternatively, the frictional material may come in close contact with different part other than the upper surface of the cap body 200. Further, the frictional material may be brought in contact and then out of contact with the upper surface of the cap body 200 in a properly determined timing relation.

Reference numeral 59 designates a thrusting unit adapted to displace the cap body 200 to a predetermined position along the displacement passage 57 against the frictional force existing between the frictional stoppage member 58 and the upper surface of the cap body 200 with thrusting force being applied to the latter. As described above, just one cap body 200 is received into the displacement passage 57 via the opening 56 and therefore the thrusting unit 59 is operated to thrust just one cap body 200. Further, since displacement distance of the cap body 200 can be determined to a predetermined length, it results that the cap body 200 is correctly located at the predetermined position on the displacement passage 57. Operation of the thrusting unit 59 is usually initiated immediately or with a certain delay after a detection signal transmitted from the sensor S is received and after completion of thrusting operation of the thrusting unit 59 the next cap body 200 located at the foremost end of the alignment rail 52 is thrusted forward from the behind so that it is automatically received at the predetermined position in the displacement passage 57 via the opening 56 to be immovably kept therein Next, description will be made as to the cap body insert unit 60. This cap body insert unit 60 is operated by way of the steps of picking up the cap body 200 located at the predetermined position in the displacement passage 57 of the cap body feeding unit 55 with the aid of vacuum suction or the like means, transferring the thus picked-up cap body to the position located above a punched hole on the film 1 which is firmly held on a table 68 with a groove 69 formed thereon, said groove 69 serving as a passage for the cap body portion 202, causing the cap body 200 to pass through a leap-up prevention member 61, inserting the cap body portion 202 through the punched hole with the flange portion 203 held on the film 1 and thereafter disengaging the cap body 200 from the cap body insert unit 60. As is apparent from the above description, transferring and inserting of the cap body 200 are initiated in response to a detection signal transmitted from the sensor S after it is correctly located at the predetermined position on the cap body feeding unit 55 with the aid of the thrusting unit 59.

Figure 7:
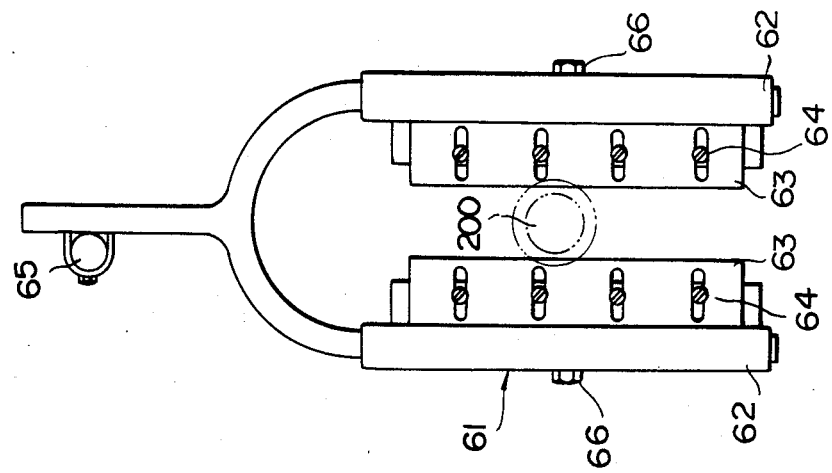
FIG. 7 is a plan view of the cap body fitting section particularly illustrating how a pair of cap body leap-up prevention members are disposed.
Figure 6:
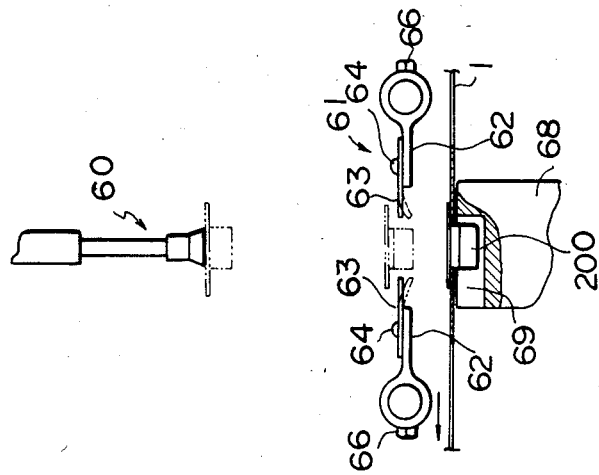
FIG. 6 is a fragmental view of a cap body fitting section schematically illustrating how the cap body portion of a cap body is correctly inserted into the punched hole while a flange portion of the cap body is held on the film.

One example of the cap body leap-up prevention member 61 is as illustrated in FIGS. 6 and 7. In the drawings reference numeral 62 designates a holder for a cap body leap-up prevention plate 63 (usually comprising thin plate made of elastomeric material such as rubber or the like) to be adjustably fitted thereto at a properly determined position in a certain angular relation and reference numeral 64 denotes set screw adapted to make fine adjustment with respect to a distance between both of the cap leap-up prevention plates 63, said fine adjustment being made in consideration of dimensions of the cap and the flange portion.

As is apparent from FIG. 7, the holders 63 are usually arranged opposite to one another in the form of a pair while they extend in the direction of travelling of the film 1, and their height can be adjusted by means of a vertically extending holder 65 so as to assure the optimum distance between the pair of holders 62 and the film 1.

The reason why the above-described arrangement has been made consists in that the cap body portion 202 should be correctly held in the punched hole at all time even in the event of an occurance of leaping-up of the whole cap body 200 above the punched hole due to malfunction such as incorrect synchronization of suction start and suction release in the cap body insert unit 60 or the like so that sealing operation is carried out without any hindrance encountered in the next step.

In the view of FIG. 6 the cap body leap up prevention member 61, a distance between the innermost end parts of the cap body leap-up prevention plates 63 is dimensioned less than the outer diameter of the flange portion 203 but more than the outer diameter of the cap body portion 202.

It should be noted that an inclination angle adjustment bolt 66 threadably fitted to the holder 62 is very effective in assuring the cap body leap-up prevention function.

After a cap body 200 is correctly received in the punched hole on the film 1 in the above-described manner, it is transported to the cap body sealing section 70 behind which a film holding station $40_a$ is disposed. Since this film holding station $40_a$ is substantially identical to the first mentioned film holding station 40, its repeated description will not be required. After the cap body 200 has reached the cap body sealing station 70, heat sealing is effected between a depressing member 72 and a table 71 so that the flange portion 203 is heat sealed to the upper surface of the film 1 by thermal fusion, said upper surface constituting the inner wall of a final product of package. Any type of heat sealing means may be used but it is found that heat sealing is effected at an excellently high operational efficiency without any fear of causing thermal deformation of the flange portion 203 when a supersonic heat sealing device is employed.

Specifically, the table 71 in the cap body sealing station 70 is formed with a recess in which the cap body portion 202 is accomodated and it is adapted to move up slightly forward the depressing member 72 before the latter is lowered in response to a mark detection signal transmitted from the sensor S so that an occurance of incorrect stretching and wrinkling of the film due to displacement of the cap body portion in the recess is effectively inhibited.

Guide rollers $12_e$ and $12_f$ disposed forwardly of the cap sealing section 70 are formed with an annular groove (not shown) at the position corresponding to the cap body 200 integrally fitted to the film 1, said annular groove having similar cross-sectional configuration to that of the cap body 200, whereby the transportation of the film 1 is smoothly conducted without any hindrance encountered due to abutment against the cap body 200.

In FIG. 1 reference numeral 13 designates a guide member adapted to be finely adjusted for the purpose of assuring correct introduction of the film 1 to a predetermined position for the subsequent step. The guide member 13 is adjustably supported by means of a support frame 14 and moreover it is formed with a groove extending in the direction of movement of the cap body 200 in the same sense as the annular groove on the guide rollers $12_e$ and $12_f$. The position where the guide member 13 is mounted and the working length of the latter are properly determined as required.

After the film 1 has passed by the guide member 13 and the guide rollers $12_{e\ and\ 12f}$, it is introduced into the longitudinal sealing section 80 (see FIG. 1). The longitudinal sealing section 80 essentially comprises a tubular guide member 81 coated with adhesive sticking prevention agent such as polytetrafluoroethylene or the like material, a pair of rollers 82 adapted to correctly locate both the side edges of the film 1, a heating member 83 having a substantially U-shaped crosssectional configuration and a pair of pressure rollers 84 for carrying out heat sealing. While the film 1 is displaced downward, both the side edges of the film 1 are caused to come in surface contact with one another in a juxtaposed relation with the aid of the rollers 82 in cooperation with the tubular guide member 81. To assure that the juxtaposed part of the side edges of the film 1 is further displaced downward while its correct position is maintained, an adjustment is made properly. When the film 1 comes to a stop, the juxtaposed part of the side edges of the film 1 is heated up to an elevated temperature in the heating member 83 and, when it reaches the pressure rollers 84 after it is displaced downward again, heat sealing is effected by means of the pressure rollers 84 whereby by a tubular product $1_a$ with a cap body attached thereto is produced. FIG. 1 schematically illustrates that a number of cap bodies 200 are integrally attached to the film 1 in an equally spaced relation at the position offset by 90 degrees from the juxtaposed part of the side edges of the film 1.

On the other hand, in case where both the side edges of the film 1 are heat sealed to one another in the form of an envelope, heat sealing is effected in such a manner that a heating member which is normally heated up to an elevated temperature is brought in pressure contact against a part of tubular member 81 adapted to serve as a stationary table or anvil while the film 1 is kept immovably.

After completion of longitudinal heat sealing, the tubular product $1_a$ is pulled downward by means of the transverse sealing section 90 so that transverse heat sealing is effected so as to form a lower sealed area while the tubular product $1_a$ is held in the flattened state at the holding position. It should be noted that the direction of flattening of the tubular $1_a$ is selectively determined so that a number of cap bodies 200 are located along the one side edge line of the flattened configuration of the tubular products $1_a$.

In FIG. 1 reference numeral 110 designates a filling section for filling the thus produced package with specific content. The filling section 110 includes a piping 111 through which a certain volume of content to be filled in the package such as liquid, viscosious fluid or the like is delivered thereto by means of a metering pump and when a lower sealed area is formed in the transverse sealing step and thereby a bag-shaped product with a cap body attached thereto is produced, the metering pump is operated to fill it with content. As shown at the lower part of FIG. 1, the transverse sealing section 90 includes a pair of thrust plates 92 which serve to define a volume of content to be filled by disposing said thrust plates 92 at a predetermined position located by the bag-shaped package so as to allow a predetermined volume of content to reside in the lower part of the package. Therefore, an excessive volume of content is repelled away upwardly under the influence of thrusting force imparted by said thrusting plates 92 and thereafter an upper sealed area (which will become a lower sealed area later) is formed by transverse sealing. The filled bag-shaped package is then displaced downward so that it is cut off along the center line of the upper sealed area by means of a cutter 101.

Thus, bag-shaped packages with a cap body attached thereto and certain content filled therein respectively are normally produced continuously at a rate of 15 to 30 bags per minute by way of the steps as described above by operating the apparatus of the invention. Further, by changing material used for packages and dimensions defining the latter a veriety of bag-shaped packages can be produced, as typically illustrated in FIG. 13(Y). As is apparent from the drawing, the modified bag-shaped package has a configuration similar to that of a conventional laminate tube which includes a cap body fitted at the foremost end thereof. In the above-described embodiment of the invention a single line of film is employed for producing packages but the invention should not be limited only to this and plural lines of films may be employable. In this case production facilities can be installed at a considerably reduced cost with a remarkably increased operational efficiency guaranteed, because transverse sealing is effected by means of a common sealing unit.

Figure 12:
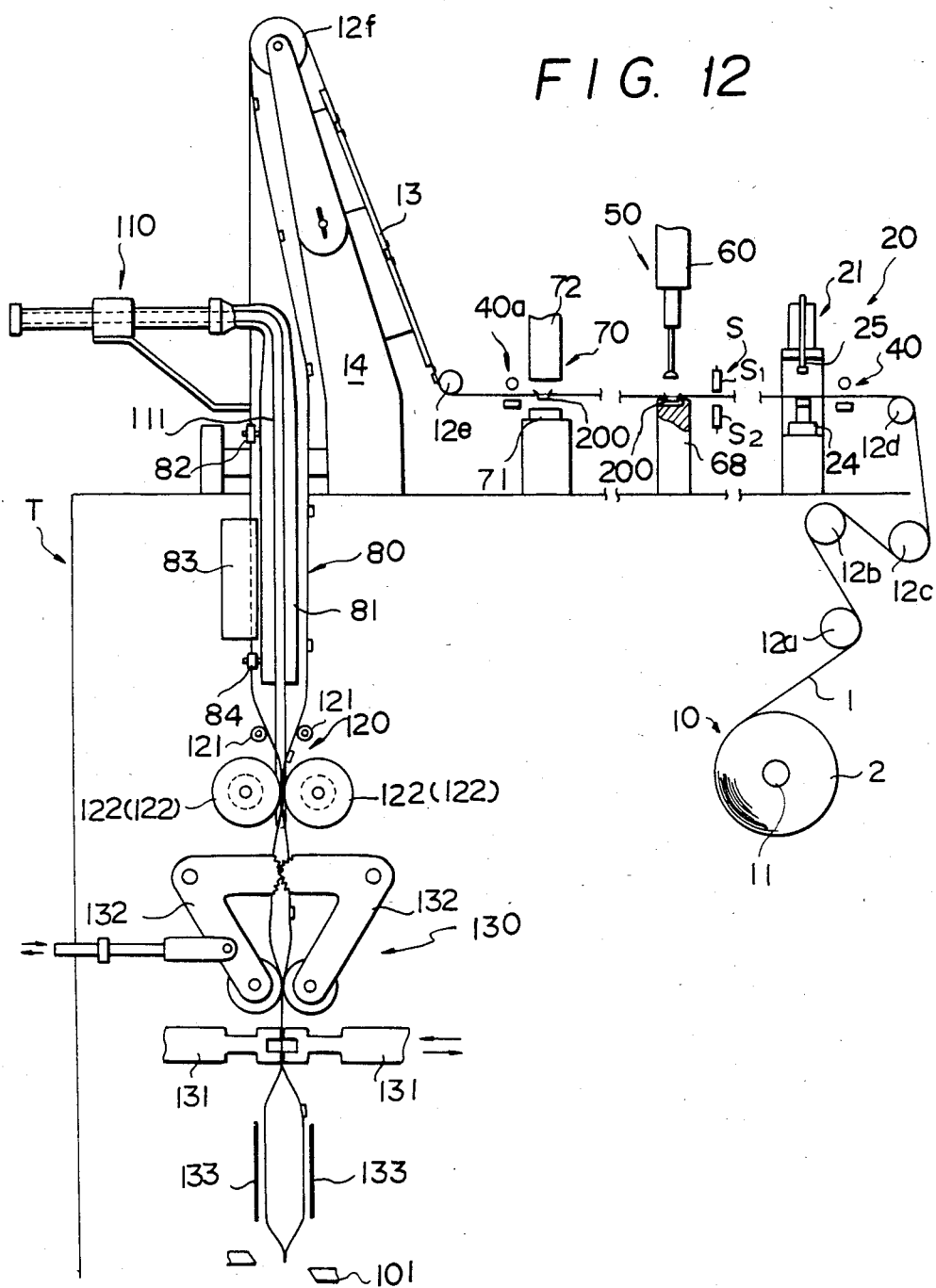
FIG. 12 is a schematic side view of the apparatus in accordance with the second embodiment of the invention, shown in the similar manner to illustration of FIG. 1.

Next, description will be made as to an apparatus in accordance with the second embodiment of the invention with reference to FIG. 12. It should be noted that same or similar components as those for the apparatus in accordance with the first embodiment are identified with same reference numerals and some of them are not illustrated and described for the purpose of simplification. Accordingly, description will be made only with respect to a film pulling section 120 and a transverse sealing section 130 both of which are different in structure from those in the foregoing embodiment.

The film pulling section 120 includes a pair of guide rollers 121 one of which is formed with an annular groove so as to allow the cap body portion 202 constituting each of the cap bodies 200 to pass therethrough, said guide rollers 121 serving to form a slightly flattened tubular product which has been subjected to longitudinal sealing in the longitudinal sealing section 80, and two pair of film pulling rollers 122 adapted to clamp said flattened tubular product from both the sides thereof, said film rollers 122 being kept inoperative until operation initiated in response to a mark detection signal transmitted from the sensor S is completed in each of the working sections, initiating their operation after completion of operations in the working sections and coming to a stop when the sensor S detects the existence of next mark, whereby the film 1 is intermittently pulled and therefore it is intermittently transported.

On the other hand, the transverse sealing section 130 includes a pair of transverse sealing members 131 in the form of a bar adapted to clamp from both the sides a tubular product with a cap body attached thereto at the first time and then clamp from both the sides a bag-shaped product with a cap body attached thereto and content filled therein at its upper opened side in response to a mark detection signal transmitted from the sensor S while it is kept immovably, said transverse sealing members 131 being located opposite to one another, a pair of jerking members 132 with jerking rollers adapted to clamp from both the sides said tubular product or said bag shaped product with an appreciably excessive volume of content filled therein across its upper opened side just prior to initiating transverse sealing operation of the transverse sealing members 131 so as to assure that transverse sealing is effected uniformly and a pair of thrusting plates 133 for allowing a predetermined volume of content to be filled in the bag-shaped product, said thrusting plates 133 continuing to come in thrusting contact with the bag-shaped product from both the sides at least until the transverse sealing members 131 initiate their transverse sealing operation and the jerking members 132 initiate their jerking operation.

As will be readily apparent, the same packages as those in the foregoing embodiment can be produced by operating the apparatus in accordance with the second embodiment.

The present invention has been described above only with respect to packages of the type of which both side edges are heat sealed in a juxtaposed relation but not with respect to packages of the type of which both side edges are heat sealed in the envelope fashion. However, by employing the method and apparatus of the invention for producing a number of packages with a cap body attached thereto it becomes possible to continuously produce at an excellently high operational efficiency packages of the type of which content can be taken out by a required volume with an operator's finger pressure applied thereto.

While the present invention has been described above only with respect to two preferred embodiments, it should of course be understood that the invention should not be limited only to them but various changes or modifications may be made in a suitable manner without any departure from the spirit and scope of the invention as defined in appended claims.

What is claimed is:

1. An apparatus for producing bag-shaped packages respectively with a cap body and filled with fluid content from an elongated thin film of synthetic resin which comprises:

a film supplying section having a film roller for feeding said film with marks at intervals defining respectively package forming areas;

a horizontally conveying section for said film from said film supplying section, said horizontally conveying section including a punching means for punching out a hole in said film one by one at each package forming area, a cap body feeding means for successively fitting cap bodies having a flange into each punched hole by passing a cap body through each punched hole and a cap securing means for heat sealing of said flange of said cap body to said film;

said horizontally conveying section further including a pair of film holder means between which are provided at least said cap body feeding means and said cap securing means for intermittently holding said film stationarily and means to open and close said holder means;

a sensor means for detecting said marks of said film for controlling the opening and closing of said film holder means; and a vertically downwardly conveying section adapted to convey said film secured with said cap bodies at respective package forming areas vertically downwardly, said vertically downwardly conveying section including a longitudinal heat sealing means for shaping said film into tubular form, a transverse heat sealing means for making bottom and top sealing lines on said tubular film at respective package forming areas, a content supplying means for supplying fluid content to said tubular film after formation of said bottom sealing line, a driving means for downwardly sending the shaped package after forming the upper sealing line by said transverse heat sealing means when said holding means are open, and a cutting means for cutting along respective transverse sealing lines.

2. The invention according to claim 1, wherein said punching means removes punched out portions of said film by feeding compressed air downwardly against said portions.

3. The apparatus according to claim 1, wherein means for forcedly separating a cap body from said cap body feeding means is provided to prevent said cap body from adhesion with said feeding means when retracting from said film.

4. The invention according to claim 1, wherein said longitudinal heat sealing means is constructed by a tubular guide member and a sealing member having a length substantially equivalent to the longitudinal length of the package forming area, and said heat sealing member being adapted to operate upon said film when said film is held stationary.

5. The invention according to claim 1, wherein said longitudinal sealing means includes a heater for constantly heating a longitudinal sealing line of said film and pressing roller means adapted for pressing said heated sealing line.

6. The invention according to claim 1, wherein said content supplying means further comprises a regulator means to restrict the content to be filled in said package in a predetermined quantity.

7. The invention according to claim 1, wherein said sensor is disposed between said film holder means of said horizontally conveying section.

8. The invention according to claim 1, wherein said punching means, said cap body feeding means and said cap securing means are disposed between said film holder means.

* * * * *